(12) United States Patent
Rapaport et al.

(10) Patent No.: US 9,099,703 B2
(45) Date of Patent: Aug. 4, 2015

(54) FAST MEA BREAK-IN AND VOLTAGE RECOVERY

(75) Inventors: Pinkhas A. Rapaport, Penfield, NY (US); Aaron J. Blowers, Lima, NY (US); James Leistra, Penfield, NY (US); Balasubramanian Lakshmanan, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 513 days.

(21) Appl. No.: 13/432,725

(22) Filed: Mar. 28, 2012

(65) Prior Publication Data

US 2013/0260266 A1 Oct. 3, 2013

(51) Int. Cl.
*H01M 8/04* (2006.01)

(52) U.S. Cl.
CPC ........ *H01M 8/04708* (2013.01); *H01M 8/0488* (2013.01); *H01M 8/04223* (2013.01); *H01M 8/04365* (2013.01); *H01M 8/04559* (2013.01); *H01M 8/04731* (2013.01); *H01M 8/04977* (2013.01); *Y02E 60/50* (2013.01)

(58) Field of Classification Search
None
See application file for complete search history.

(56) References Cited

U.S. PATENT DOCUMENTS

| 2008/0226952 A1* | 9/2008 | Lei et al. ......................... 429/13 |
| 2009/0155635 A1* | 6/2009 | Cho et al. ........................ 429/13 |
| 2009/0286112 A1 | 11/2009 | Oh |

* cited by examiner

*Primary Examiner* — Sarah A. Slifka
(74) *Attorney, Agent, or Firm* — John A. Miller; Miller IP Group, PLC

(57) ABSTRACT

A system and method for breaking-in and humidifying membrane-electrode-assemblies (MEAs) in a fuel cell stack. The method includes performing voltage cycling and humidification of the MEAs in the stack, including one or more temperature steps wherein current density of the stack is cycled within a predetermined range for each of the one or more temperature steps. The method also includes maintaining a fuel cell stack voltage within a predetermined range, and maintaining anode and cathode reactant flows at an approximate set-point during the current density cycling of the one or more temperature steps to break-in and humidify the MEAs in the stack so that the stack is able to operate at a predetermined threshold for a fuel cell stack voltage output capability.

20 Claims, 4 Drawing Sheets

FAST MEA BREAK-IN AND VOLTAGE RECOVERY

BACKGROUND OF THE INVENTION

1. Field of the Invention

This invention relates generally to a method for membrane-electrode-assembly (MEA) break-in and voltage recovery and, more particularly, to a method for MEA break-in and voltage recovery that includes increasing a fuel cell stack temperature in a stepwise manner from approximately room temperature to a temperature that is consistent with high fuel cell stack load operation, maintaining constant anode and cathode reactant flows for each temperature step and cycling fuel cell stack current density over a number of cycles to provide an efficient and fast break-in for the MEAs in the fuel cell stack.

2. Discussion of the Related Art

Hydrogen is a very attractive fuel because it is renewable and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is catalytically split in an oxidation half-cell reaction in the anode catalyst layer to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell type for vehicles. The PEMFC generally includes a solid polymer electrolyte proton conducting membrane, such as a perfluorosulfonic acid membrane. The anode and cathode typically include finely dispersed catalytic particles, usually platinum (Pt), supported on carbon particles and mixed with an ionomer. The catalytic mixture is deposited on opposing sides of the membrane where it forms the anode and cathode catalytic layers. The combination of the anode catalytic layer, the cathode catalytic layer and the membrane define a membrane electrode assembly (MEA). MEAs require adequate fuel and oxidant supply and also humidification for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEA within a fuel cell needs to have sufficient water content so that the ionic resistance across the membrane and anode and cathode catalytic layers is low enough to effectively conduct protons. Humidification for the membrane and the ionomer in the catalytic layers may come from the stack water by-product or external humidification. The MEAs in a newly built fuel cell stack are dry, i.e., they essentially lack ionic conductivity.

As mentioned above, water is generated as a by-product of the stack operation. Therefore, the cathode exhaust gas from the stack will typically include water vapor and liquid water. It is known in the art to use a water vapor transfer (WVT) unit to capture some of the water in the cathode exhaust gas, and use the water to humidify the cathode input airflow. Water in the cathode exhaust gas at one side of the water transfer elements, such as membranes, is absorbed by the water transfer elements and transferred to the cathode air stream at the other side of the water transfer elements.

Both break-in or conditioning and voltage recovery are required for the MEAs in a newly fabricated fuel cell stack to obtain optimal performance during initial operation of the stack. There are three main functions of MEA break-in and voltage recovery: humidification, removal of residual solvents and other impurities from MEA manufacturing and removal of anions from the catalyst to activate reaction sites. The current state of the art procedures for break-in and voltage recovery of the MEAs require from 1 to over 15 hours of fuel cell operation targeting different levels of resulting functionality. Thus, there is a need in the art to provide a method of break-in and voltage recovery of the MEAs in a short period of time that is still capable of achieving the three main functions and that also provides the targeted performance level.

SUMMARY OF THE INVENTION

In accordance with the teachings of the present invention, a system and method is disclosed for breaking-in and humidifying membrane-electrode-assemblies (MEAs) in a fuel cell stack. The method includes performing voltage cycling and humidification of the MEAs in the fuel cell stack, including one or more temperature steps wherein current density of the stack is cycled within a predetermined range for each of the one or more temperature steps. The method also includes maintaining a fuel cell stack voltage within a predetermined range, and maintaining anode and cathode reactant flows at an approximate set-point during the current density cycling of the one or more temperature steps to break-in and humidify the MEAs in the stack so that the stack is able to operate at a predetermined threshold for a fuel cell stack voltage output capability.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for membrane-electrode assembly (MEA) break-in and voltage recovery is merely exemplary in nature, and is in no way intended to limit the invention or its applications or uses.

Figure 1:
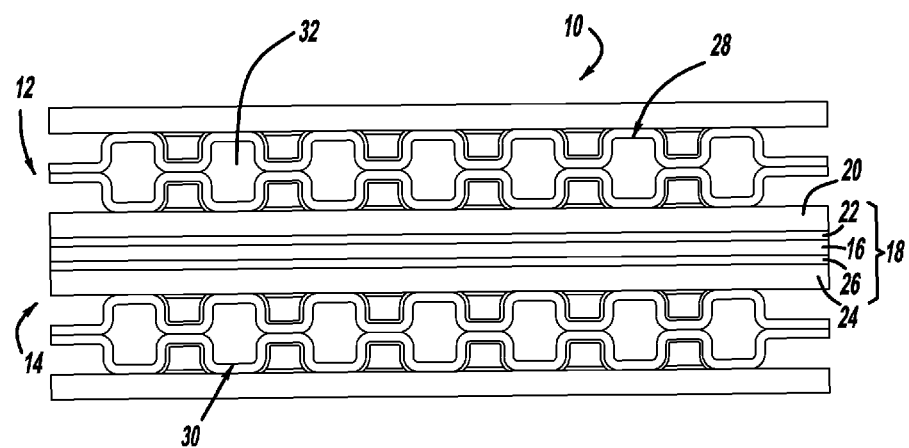
FIG. 1 is a cross-sectional view of a fuel cell.

FIG. 1 is a cross-sectional view of a fuel cell 10 that is part of a fuel cell stack of the type discussed below. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA 18. The diffusion media layers 20 and 24 are porous layers that provide for input gas transport to and water transport from the MEA 18. A cathode side flow field plate or bipolar plate 28 is provided on the cathode side 12, and an anode side flow field plate or bipolar plate 30 is provided on the anode side 14. Coolant flow channels 32 are provided in the bipolar plates 28 and 30 to allow for a cooling fluid to flow through the fuel cells 10.

Figure 2:
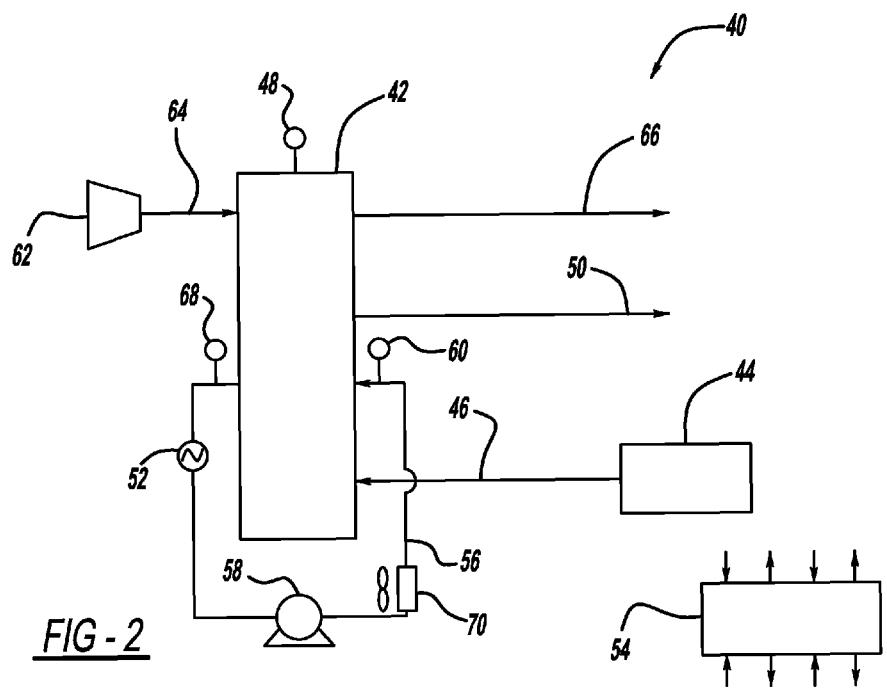
FIG. 2 is a simplified block diagram of a fuel cell system.

FIG. 2 is a simplified block diagram of a fuel cell system 40 including a fuel cell stack 42. The fuel cell system 40 is intended to generally represent any type of testing environment for the fuel cell stack 42. Hydrogen gas from a hydrogen source 44 is provided to the anode side of the fuel cell stack on line 46. Anode exhaust exits the stack 42 on line 50. A compressor 62 provides a cathode inlet airflow on a cathode input line 64 to the stack 42. A cathode exhaust gas is output from the stack 42 on a cathode exhaust line 66.

The fuel cell system 40 also includes a thermal sub-system for controlling the temperature of the fuel cell stack 42. Particularly, a cooling fluid pump 58 pumps a cooling fluid through a coolant loop 56 outside of the fuel cell stack 42 and through the coolant channels 32 in the stack 42. A radiator 70 and a heater 52 on the coolant loop 56 are used to maintain the stack 42 at a desired temperature, as discussed in more detail below.

A temperature sensor 60 measures the temperature of the coolant at a coolant inlet to the fuel cell stack 42 and a temperature sensor 68 measures the temperature of the coolant at a coolant outlet of the stack 42. A voltage sensor 48 measures the average fuel cell voltage for the fuel cells 10 in the stack 42. A controller 54 receives a temperature signal from the temperature sensor 60 that indicates the temperature of the coolant at a coolant inlet of the stack 42, and the controller 54 receives a temperature signal from the temperature signal 68 that indicates the temperature of the coolant at a coolant outlet of the stack 42. The controller also receives a fuel cell voltage signal from the voltage sensor 48 and controls the radiator 70, coolant pump 58 and heater 52 of the thermal sub-system. The controller 54 further controls the speed of the compressor 62 and the flow of hydrogen from the hydrogen source 44. An algorithm of the controller 54 performs break-in and voltage recovery for the MEAs in the stack 42 as is discussed in more detail below. The controller 54 may be any control system or central processing unit (CPU), as is readily understood by those skilled in the art.

As discussed above, both break-in and voltage recovery are required for MEAs in a newly fabricated fuel cell stack to obtain desired performance during initial operation of the stack. The three main functions of MEA break-in and voltage recovery are: humidification, removal of residual solvents and other impurities from MEA manufacturing, and removal of anions from the catalyst to activate reaction sites in order to decrease the overpotentials of the anode and cathode catalytic layers. As is also discussed above, there is a need for a shorter break-in and voltage recovery time of MEAs to reduce the costs associated with the break-in and voltage recovery of the MEAs. By reducing the amount of time needed, the costs associated with production and the usage of reactants such as hydrogen may be reduced. Procedures are currently used in the art mostly employ two separate protocols for voltage recovery and break-in of MEAs, which require a total time in the range between from approximately 1 hour to over 15 hours of fuel cell operation and procedures that are currently used do not have a well defined target. Moreover, the shortest of the procedures currently used that also includes voltage cycling apply a current to the cells in the stack without any relation to cell temperature and/or level of humidification. In the procedure discussed below, the magnitude of the current applied is not increased before a certain predetermined level of humidification is achieved.

Figure 3:
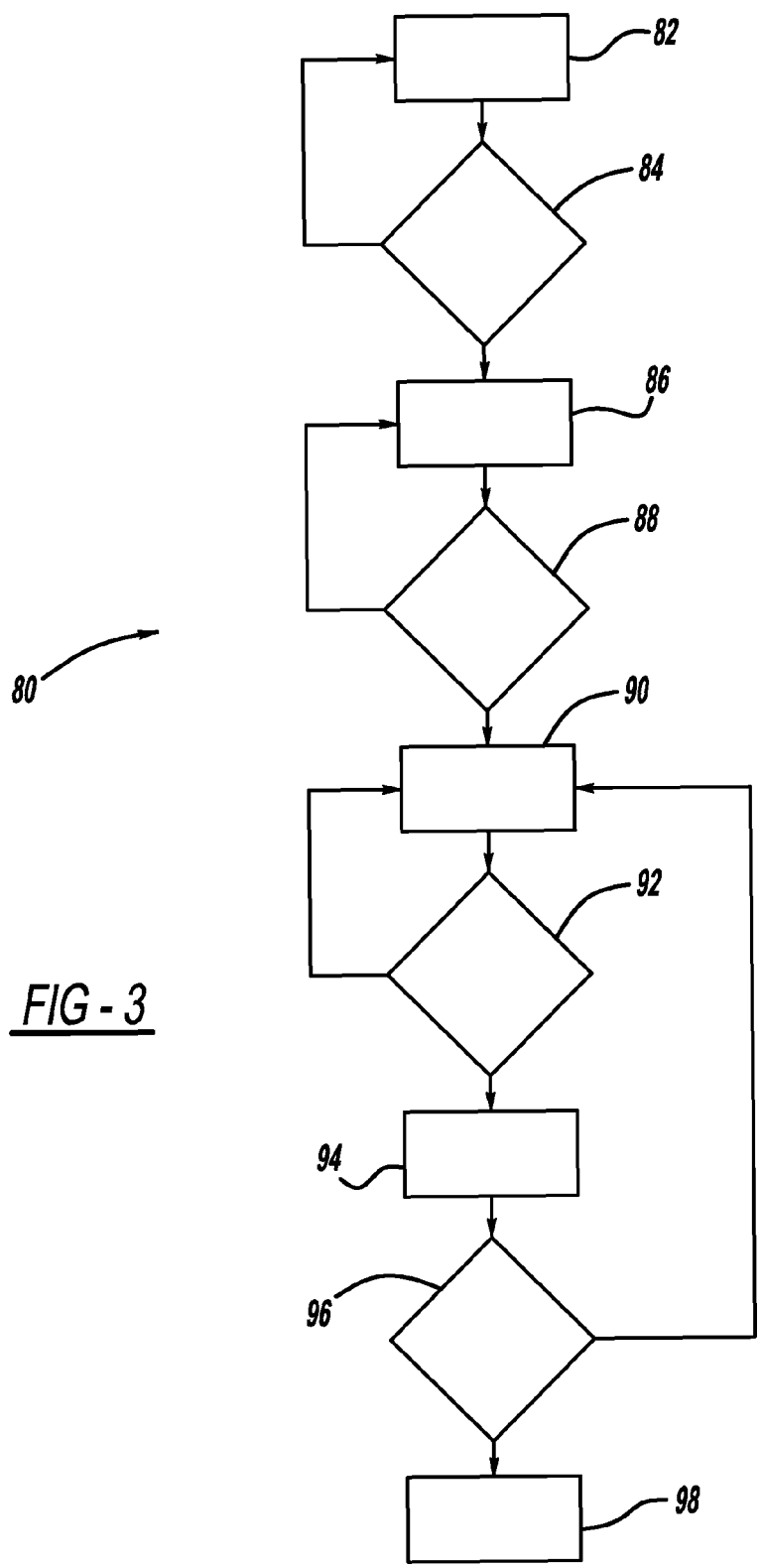
FIG. 3 is a flow chart diagram of an algorithm for membrane-electrode-assembly (MEA) break-in and voltage recovery.

FIG. 3 is a flow diagram 80 of an algorithm for a shorter break-in and voltage recovery of the MEAs 18 in the fuel cell stack 42. The algorithm is part of the controller 54 shown in FIG. 2. The steps of voltage recovery and break-in of the MEAs 18 are combined according to the algorithm into a single sequence that, for this example, requires only approximately 90 minutes to verify that the MEAs 18 in the stack 42 have achieved a targeted performance level capability. Although not shown for the sake of clarity, a shorting check is performed on the fuel cell stack 42 to determine if the fuel cell stack is ready for the algorithm of flow diagram 80 to begin.

Voltage cycling combined with humidification begins at box 82. Voltage cycling combined with humidification is performed at several different temperature steps ranging from approximately room temperature to a temperature that is consistent with high load operation. For example, six temperature steps can be used. FIG. 3 shows three temperature steps for the sake of brevity. As shown in the flow diagram 80, the first temperature step at box 82 uses a temperature range that is near room temperature, the second temperature step at box 86 uses a temperature range that is above room temperature, and the last temperature step at box 90 uses a temperature range that is consistent with an expected temperature for a stack operating with a high fuel cell stack load. The temperature of a stack operating with a high fuel cell stack load will vary with stack characteristics.

At each temperature step of the boxes 82, 86 and 90, the voltage cycling is achieved by cycling the load, i.e., cycling the current density, between predetermined lower and upper levels assigned for the load increment for each temperature step. At each load increment, the anode reactant gas flow and the cathode reactant gas flow through the stack 42 are at a constant rate. For example, the anode reactant flow is set such that the anode stoichiometry is approximately 1.5 and the cathode stoichiometry is approximately 1.1 relative to the upper level of the current load increment, i.e., the air flow is kept at a level that is close to the minimum amount of air flow necessary to support the electrochemical reaction.

For each temperature step of the boxes 82, 86 and 90 the range of current density cycling is changed. By way of example, at the box 82 the current density range is approximately 0.1-0.2 A/cm$^2$. Voltage cycling at the box 82 continues until the maximum voltage for each current density cycle within the given temperature step of the box 82 does not continue to increase, as determined at decision diamond 84. If the voltage for each current density cycle for the temperature step of the box 82 does not continue to increase at the decision diamond 84, the algorithm moves on to the next temperature step and the next current cycling range at the box 86. For example, the next current density range for the cycle at the box 86 is at a current density range of approximately 0.2-0.3 A/cm$^2$. The thermal sub-system and the controller 54, discussed above, control the stepwise increase in temperature of the fuel cell stack 42. If the maximum voltage for the current density cycle of the temperature step at the box 82 is still increasing, as determined at the decision diamond 84, the algorithm returns to the box 82 and continues voltage cycling at the temperature step of the box 82.

Once the algorithm moves on to the temperature step at the box 86, voltage cycling at the box 86 continues until the maximum voltage for each current density cycle within the given temperature step at the box 86 does not continue to increase, as determined at decision diamond 88. If the voltage is not increasing, the algorithm moves on to the next temperature step and the cycling for the next current density range at box 90. However, if the maximum voltage for the current density cycling of the temperature step at the box 86 is still increasing, as determined at the decision diamond 88, the algorithm returns to the box 86 and continues voltage cycling at the temperature step of the box 86. Once the algorithm moves on to the temperature step at the box 90, voltage cycling at the box 90 continues until the maximum voltage for each current density cycle within the given temperature step of the box does not continue to increase, as determined at decision diamond 92. If the voltage is not increasing, the algorithm moves on to a performance verification step at box 94, as discussed in detail below. However, if the maximum voltage for the current density cycling of the temperature step at the box 90 is still increasing, as determined at the decision diamond 92, the algorithm returns to the box 90 and continues voltage cycling at the temperature step of the box 90.

Figure 4:
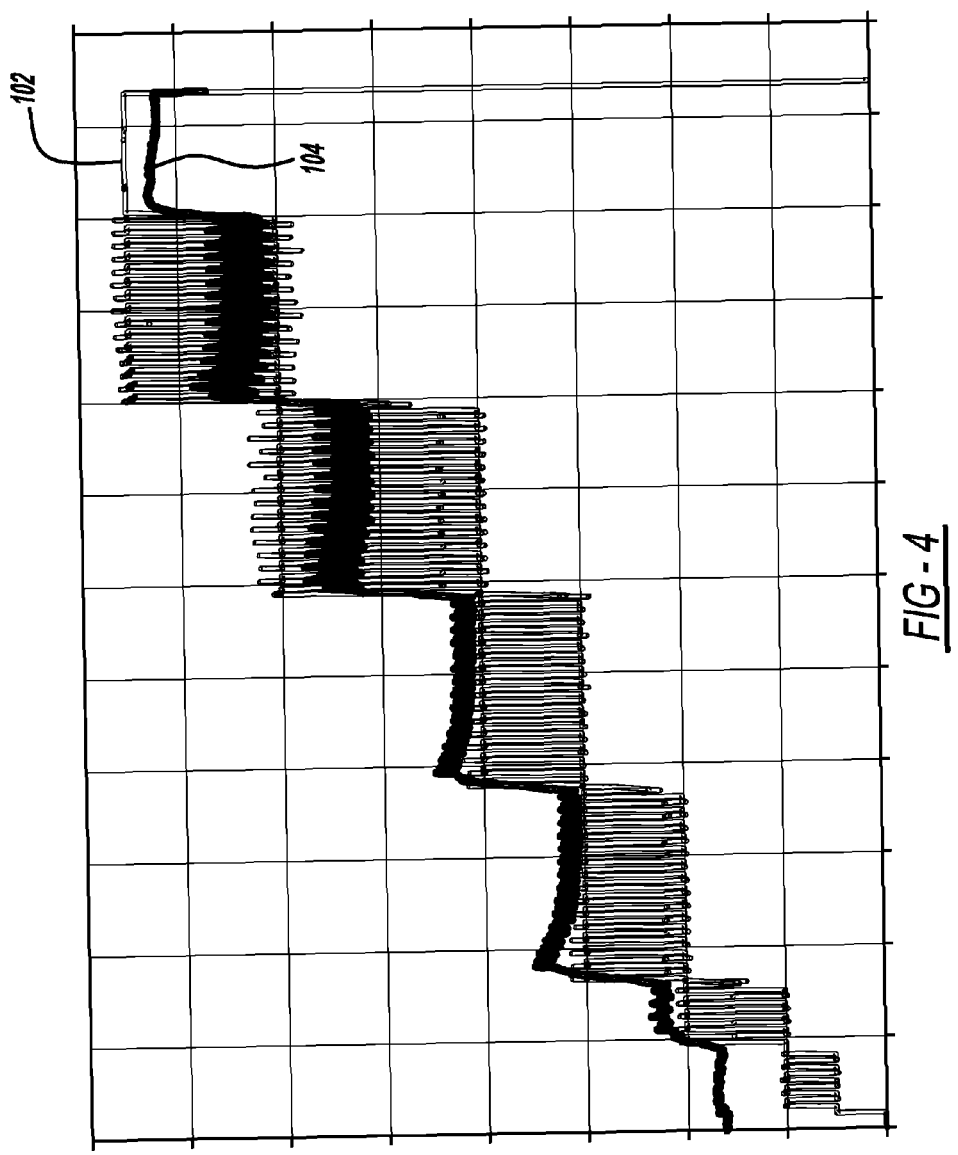
FIG. 4 is a graph with time on the horizontal axis, average coolant temperature on the right vertical axis and current density on the left vertical axis that illustrates a procedure for MEA break-in and voltage recovery.

Humidification is carried out simultaneously with voltage cycling at the boxes 82, 86 and 90 as discussed above. FIG. 4 is a graph with time on the horizontal axis, average coolant temperature on the right vertical axis and current density on the left vertical axis. Line 102 represents the current density cycles for each temperature step similar to that shown in FIG. 5, discussed below, and line 104 represents average coolant temperature for the fuel cells 10 in the stack 42. As shown in FIG. 4, the temperature of the fuel cell stack 42 is kept low at the beginning of voltage cycling and humidification. For example, the temperature of the stack 42 at the beginning of voltage cycling and humidification at the box 82 is approximately room temperature, or approximately 25° C. As current density cycling continues, the temperature of the stack 42 is allowed to increase stepwise, as shown by the coolant temperature line 104. The purpose of starting the voltage cycling and humidification at a low temperature and increasing the temperature of the stack 42 in a stepwise manner is to ensure that the small amount of by-product water produced by the electrochemical reaction at low current density remains in the form of liquid water, i.e., condensed water, so as to enable the membranes 16 of the stack 42 to become adequately humidified and also to begin washing away solvents and impurities that may be present from fabrication out of the stack 42. It is more efficient to remove anions and platinum oxide from the MEAs 18 at higher temperature, however, the membranes 16 should be adequately humidified before exposed to high fuel cell stack current and operating temperatures to avoid damaging the membranes 16. Thus, the temperature is started out low and is increased stepwise in the algorithm of flow diagram 80, as discussed above.

Figure 5:
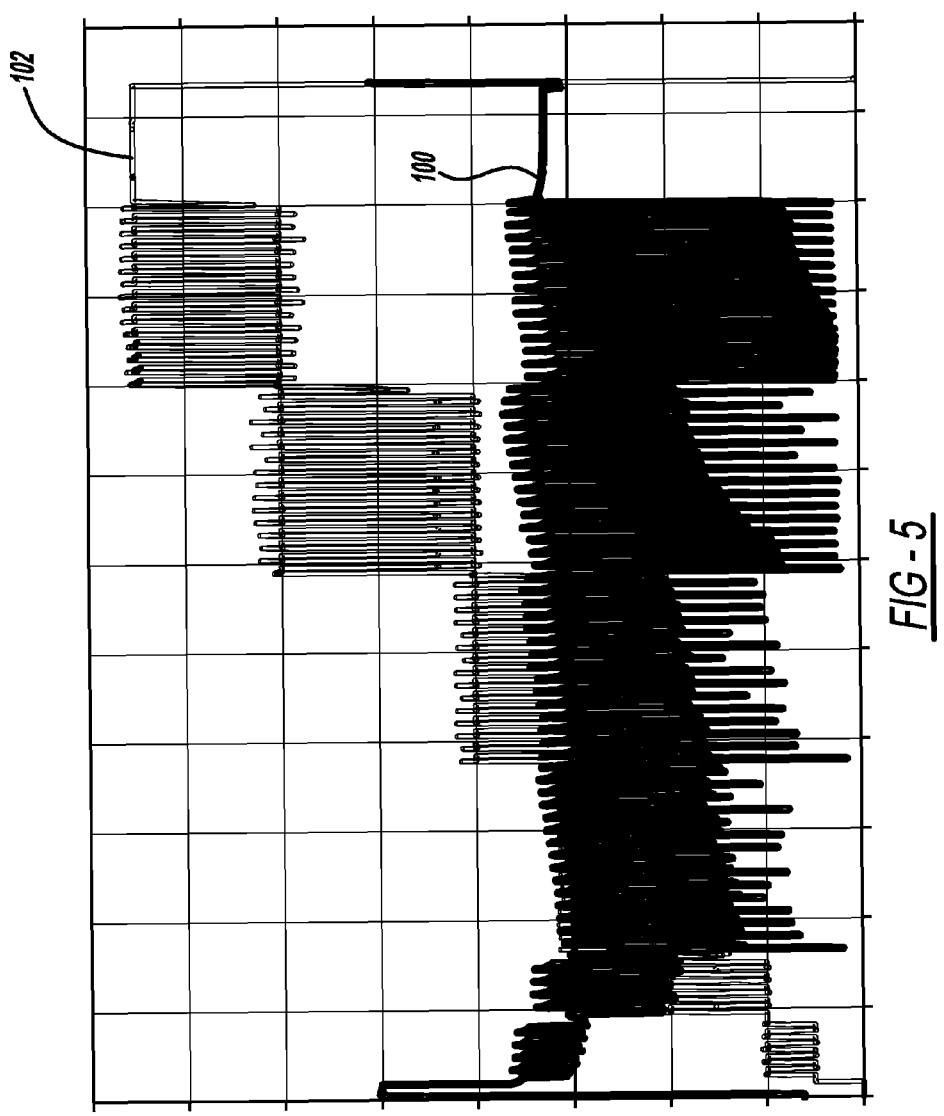
FIG. 5 is a graph with time on the horizontal axis, average fuel cell stack voltage on the right vertical axis and stack current density on the left horizontal axis that illustrates a procedure for MEA break-in and voltage recovery.

For each temperature step and the corresponding current density cycling at the boxes 82, 86 and 90, current density cycling can occur as many times as desired. FIG. 5 is a graph with time on the horizontal axis, average fuel cell voltage on the right vertical axis and current density on the left vertical axis illustrating how current density is increased according to the algorithm of flow diagram 80. As shown in FIG. 5, the voltage of the stack 42 is kept low during voltage cycling and humidification. For example, the voltage may be maintained between −200 and 800 mV throughout the voltage cycling and humidification procedure. In FIG. 5, line 100 represents voltage, which is maintained within a predetermined range, and line 102 represents current density, which is increased in increments in parallel with each temperature step as shown in FIG. 4. For each temperature step the current density is cycled approximately five times or more, however, FIG. 5 is merely an example. The number of temperature steps and the number of current density cycles for each temperature step that occur depend on factors such as the desired conditioning of the fuel cell stack 42 and the change in voltage during the current density cycling of the temperature steps.

If the predetermined threshold at the very end of the voltage cycling and humidification is a certain voltage output capability, the number of current density cycles performed can be targeted for the desired capability and will depend on stack characteristics. For example, if 70% voltage output capability is the target for the fuel cell stack 42, meaning the stack 42 will be able to operate at 70% power after the algorithm of flow diagram 80 is complete, then the number of current density cycles required at each temperature step to achieve the goal of 70% power will be needed. As stated above, the number of cycles required to achieve the target of 70% voltage output capability will depend on stack characteristics. Under such circumstances, additional break-in through use of the fuel cell stack 42 will be necessary before the stack 42 can achieve 100% power.

Anode and cathode stoichiometry are kept relatively low during the voltage cycling and humidification to ensure that the by-product water that is produced during the electrochemical reaction is not lost due to high reactant flow rate, particularly a high cathode flow rate, because high reactant flow may dry out the MEAs of the stack 42. Another reason to keep the cathode air flow low, i.e., cathode stoichiometry low, is to keep the voltage of the stack 42 low. At higher load levels during the current density cycling it is possible that the voltage may drop to approximately −0.1 volts due to low cathode stoichiometry and high water content. While negative voltage is typically undesirable, it is believed that brief instances of a slight negative voltage caused by oxygen depletion will be tolerated by the fuel cell stack 42.

After voltage cycling combined with humidification is completed, as determined by the decision diamond 92, anode and cathode stoichiometry sensitivity tests are performed, although not shown in flow diagram 80 for the sake of clarity. After completing the last temperature step, i.e., the highest temperature step of the box 90, a performance verification step is performed at box 94. A performance test of the fuel cell stack 42 at a predetermined load level for chosen operating conditions is performed at the performance verification step of the box 94. The performance test is performed to confirm that the expected performance level for the stack 42 has been achieved and break-in of the MEAs is complete. If the performance test at the box 94 meets a predetermined performance level at a decision diamond 96, the algorithm continues to box 98 and the break-in process is considered complete. If the predetermined performance level has not been achieved, as determined at the decision diamond 96, then the algorithm returns to the box 90 for a repeat of current density cycling at the step with the highest temperature.

A hydrogen take-over test is performed after the performance test is complete to confirm the absence of cross-over leaks after completion of the voltage cycling and humidification, however, this step is not shown in flow diagram 80 for the sake of clarity.

The total time required for the algorithm described above is approximately 80-90 minutes, depending on factors such as time required for temperature transitions, the number of current density cycles for each temperature step, and the additional testing such as the performance test.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for breaking-in and humidifying membrane-electrode-assemblies (MEAs) in a fuel cell stack, said method comprising:
performing voltage cycling and humidification of the MEAs in the fuel cell stack, including one or more temperature steps wherein current density of the stack is cycled within a predetermined range for each of the one or more temperature steps, maintaining a fuel cell stack voltage within a predetermined range, and maintaining anode and cathode reactant flows at an approximate set-point during the current density cycling of the one or more temperature steps such that by-product water from a fuel cell stack electrochemical reaction condenses to break-in and humidify the MEAs in the stack so that the stack is able to operate at a predetermined threshold for a fuel cell stack voltage output capability.

2. The method according to claim 1 wherein cycling the current density within a predetermined range for each of the one or more temperature steps includes increasing the range of the current density used for current density cycling of the stack in increments that are in parallel with the temperature steps.

3. The method according to claim 1 wherein the fuel cell stack voltage is maintained within a predetermined range during break-in and humidification of the MEAs.

4. The method according to claim 1 wherein the one or more temperature steps each include a predetermined temperature range, and the temperature increases for each of the one or more temperature steps at a rate that is low enough to allow for by-product water from a fuel cell stack electrochemical reaction to condense and wash out solvents and impurities that remain from an MEA manufacturing process.

5. The method according to claim 1 wherein maintaining the anode and cathode reactant flows at an approximate set-point includes maintaining the approximate set-point of the anode and the cathode reactant flows at approximately a minimum amount of flow that is necessary to support fuel cell stack electrochemical reactions for the current density range of the one or more temperature steps.

6. The method according to claim 1 wherein the approximate set-point of the anode and the cathode reactant flows are 1.5 and 1.1, respectively, for the current density range of the one or more temperature steps.

7. The method according to claim 1 wherein a temperature of the fuel cell stack is at approximately room temperature at a beginning of a first of the one or more temperature steps.

8. The method according to claim 1 wherein humidifying the MEAs occurs before the one or more temperature steps are complete so as to minimize the risk of damaging membranes in the MEAs.

9. A method for breaking-in and humidifying membrane-electrode-assemblies (MEAs) in a newly fabricated fuel cell stack, said method comprising:
performing voltage cycling and humidification of the MEAs, including a plurality of temperature steps wherein current density of the stack is cycled within a predetermined range for each of the plurality of temperature steps, maintaining a fuel cell stack voltage within a predetermined range, and maintaining anode and cathode reactant flows at an approximate set-point during the current density cycling of the plurality of temperature steps such that by-product water from a fuel cell stack electrochemical reaction condenses to break-in and humidify the MEAs in the stack so that the fuel cell stack is able to operate at a predetermined threshold for fuel cell stack voltage output capability.

10. The method according to claim 9 wherein each of the plurality of temperature steps includes a predetermined temperature range, and the temperature increases at each of the plurality of temperature steps at a rate that is low enough to allow for by-product water from fuel cell stack electrochemical reactions to condense and wash out solvents and impurities that remain from an MEA manufacturing and stack fabrication process.

11. The method according to claim 9 wherein a temperature of the fuel cell stack is at approximately room temperature at a beginning of a first of the plurality of temperature steps.

12. The method according to claim 9 further comprising humidifying the MEAs before the plurality of temperature steps are complete so as to minimize the risk of damaging membranes in the MEAs.

13. The method according to claim 9 wherein cycling the current density within a predetermined range for each of the plurality of temperature steps includes increasing the range of the current density used for current density cycling of the stack in increments that are in parallel with the plurality of temperature steps.

14. The method according to claim 9 wherein maintaining the anode and cathode reactant flows at an approximate set-point includes maintaining the approximate set-point of the anode and the cathode reactant flows at approximately a minimum amount of flow that is necessary to support fuel cell stack electrochemical reactions for the predetermined current density range of each of the plurality of temperature steps.

15. The method according to claim 9 wherein the approximate set-point of the anode and the cathode reactant flows are 1.5 and 1.1, respectively, for the predetermined current density range for each of the plurality of temperature steps.

16. A system for breaking-in and humidifying membrane-electrode-assemblies (MEAs) in a fuel cell stack, said system comprising:
an anode input and a cathode input to the fuel cell stack, said anode input flowing anode reactant gas to the fuel cell stack and said cathode input flowing cathode reactant gas to the fuel cell stack;

a temperature sensor, said temperature sensor measuring a temperature of the fuel cell stack; and a controller configured to control the temperature and current density of the stack such that the temperature of the stack increases over one or more temperature steps and the current density of the stack is cycled within a predetermined range for each of the one or more temperature steps, said controller controlling a fuel cell stack voltage such that the voltage is maintained within a predetermined range, said controller further controlling the anode and the cathode reactant flows so that the anode and cathode reactant flows are maintained near an approximate set-point during the current density cycling of the one or more temperature steps such that by-product water from a fuel cell stack electrochemical reaction condenses so that the stack is able to operate at a predetermined threshold of fuel cell stack voltage output capability after the voltage cycling and humidification is complete.

17. The system according to claim 16 wherein the controller controls the temperature of the fuel cell stack so that the one or more temperature steps increase in temperature at a rate that is low enough to allow by-product water from fuel cell stack electrochemical reactions to condense and wash out solvents and impurities that remain from an MEA manufacturing process.

18. The system according to claim 16 wherein the controller controls the temperature of the fuel cell stack so that the temperature of the fuel cell stack is at approximately room temperature at the beginning of voltage cycling and humidification.

19. The system according to claim 16 wherein the controller maintains the voltage of the stack within a predetermined range during voltage cycling and humidification.

20. The system according to claim 16 wherein the controller controls the anode and the cathode reactant flows for a given current density at approximately a minimum amount of flow that is necessary to support fuel cell stack electrochemical reactions for the predetermined current density range of each of the plurality of temperature steps.

* * * * *